United States Patent
Song et al.

(10) Patent No.: US 10,614,202 B2
(45) Date of Patent: Apr. 7, 2020

(54) ELECTRONIC DEVICE

(71) Applicant: Samsung Electronics Co., Ltd., Suwon-si, Gyeonggi-do (KR)

(72) Inventors: Kyunghoon Song, Yongin-si (KR); Yoonoh Chi, Suwon-si (KR); Gyeongmin Jin, Seoul (KR); Kwangsub Lee, Yongin-si (KR); Saebom Lee, Suwon-si (KR); Seyoung Jang, Seongnam-si (KR); Chihyun Cho, Suwon-si (KR); Yunjang Jin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 15/141,279

(22) Filed: Apr. 28, 2016

(65) Prior Publication Data

US 2016/0321442 A1 Nov. 3, 2016

(30) Foreign Application Priority Data

Apr. 29, 2015 (KR) .......... 10-2015-0060451

(51) Int. Cl.
*G06F 3/044* (2006.01)
*G06F 21/32* (2013.01)
(Continued)

(52) U.S. Cl.
CPC ............ *G06F 21/32* (2013.01); *G06F 1/1626* (2013.01); *G06F 1/1656* (2013.01);
(Continued)

(58) Field of Classification Search
CPC ........ G06F 21/32; G06F 1/1696; G06F 1/169; G06F 1/1633; G06F 1/1615–1/1626; G06F 1/1607; G06F 3/03547; G06F 3/044; G06F 3/0488; G06F 3/041; G06F 2203/0338; G06F 2203/04103; G06F 1/1684; G06F 1/1671; G06F 21/30; H04M 1/23;
(Continued)

(56) References Cited

U.S. PATENT DOCUMENTS 9,459,656 B2 * 10/2016 Shai ...................... G06F 1/1615
10,452,888 B2 * 10/2019 Xu ....................... H01L 27/3244
(Continued)

FOREIGN PATENT DOCUMENTS

| KR | 10-2014-0123810 A | 10/2014 |
|---|---|---|
| WO | 2013/173773 A1 | 11/2013 |
| WO | 2014/171751 A1 | 10/2014 |

*Primary Examiner* — Michael J Eurice
(74) *Attorney, Agent, or Firm* — Jefferson IP Law, LLP

(57) ABSTRACT

An electronic device is provided. The electronic device includes an input sensing module that detects at least two inputs and a processor that controls the electronic device to perform a function corresponding to an input received through the input sensing module, wherein the input sensing module includes at least one fingerprint recognition sensor, at least one touch sensor, and an input processor electrically connected to the at least one fingerprint recognition sensor and the at least one touch sensor and that processes an input received from the at least one fingerprint recognition sensor or the at least one touch sensor and that transfers the input to the processor.

13 Claims, 18 Drawing Sheets

(51) Int. Cl.
*G06F 3/041* (2006.01)
*G06F 3/0488* (2013.01)
*H04M 1/23* (2006.01)
*H01H 13/04* (2006.01)
*G06F 1/16* (2006.01)
*G06F 3/0354* (2013.01)
*G06K 9/00* (2006.01)
*H04M 1/67* (2006.01)

(52) U.S. Cl.
CPC ........ *G06F 1/1684* (2013.01); *G06F 3/03547* (2013.01); *G06F 3/041* (2013.01); *G06F 3/044* (2013.01); *G06F 3/0488* (2013.01); *G06K 9/0002* (2013.01); *H01H 13/04* (2013.01); *H04M 1/23* (2013.01); *G06F 2203/0338* (2013.01); *G06F 2203/04103* (2013.01); *H04M 1/67* (2013.01)

(58) Field of Classification Search
CPC ....... H04M 1/67; H01H 13/04; G06K 9/0002; G06K 9/001; G06K 9/00053; G06K 9/00006; G06K 9/0008; H04N 21/4415; H05K 1/189
See application file for complete search history.

(56) References Cited

U.S. PATENT DOCUMENTS

| | | | | |
|---|---|---|---|---|
| 2004/0252867 A1* | 12/2004 | Lan | G06K 9/0004 382/124 |
| 2006/0084254 A1* | 4/2006 | Attarwala | H01L 21/4857 438/584 |
| 2006/0279545 A1* | 12/2006 | Lan | G06F 3/0317 345/166 |
| 2009/0003664 A1 | 1/2009 | Setlak et al. | |
| 2009/0206848 A1* | 8/2009 | Chuang | G06K 9/0002 324/686 |
| 2009/0304241 A1 | 12/2009 | Shigenobu et al. | |
| 2011/0026199 A1* | 2/2011 | Zhang | H01H 13/705 361/679.01 |
| 2012/0092350 A1 | 4/2012 | Ganapathi et al. | |
| 2013/0170166 A1* | 7/2013 | Ziglioli | B81B 7/0048 361/777 |
| 2013/0259329 A1* | 10/2013 | Wickboldt | H05K 1/189 382/124 |
| 2013/0272586 A1* | 10/2013 | Russo | G06K 9/00087 382/124 |
| 2013/0307818 A1* | 11/2013 | Pope | G06F 3/044 345/174 |
| 2013/0341398 A1 | 12/2013 | Rao | |
| 2014/0103943 A1* | 4/2014 | Dunlap | H01L 21/4857 324/663 |
| 2014/0219520 A1* | 8/2014 | Myers | G06K 9/00087 382/124 |
| 2014/0225821 A1 | 8/2014 | Kim et al. | |
| 2014/0241595 A1* | 8/2014 | Bernstein | G06K 9/0002 382/124 |
| 2014/0333328 A1* | 11/2014 | Nelson | G06F 3/044 324/663 |
| 2014/0362013 A1* | 12/2014 | Nikoozadeh | G06F 3/0414 345/173 |
| 2015/0030217 A1* | 1/2015 | Wickboldt | G06K 9/00026 382/124 |
| 2015/0047017 A1* | 2/2015 | Kim | G06F 21/32 726/19 |
| 2015/0064432 A1* | 3/2015 | Matsuyuki | G02B 1/115 428/216 |
| 2015/0071509 A1 | 3/2015 | Myers | |
| 2015/0086090 A1* | 3/2015 | Jung | G06K 9/00013 382/124 |
| 2015/0135108 A1* | 5/2015 | Pope | G06K 9/00006 715/767 |
| 2015/0177884 A1* | 6/2015 | Han | G06F 3/044 345/174 |
| 2015/0185983 A1* | 7/2015 | Yang | G06F 3/03547 345/173 |
| 2015/0199554 A1* | 7/2015 | Merrell | G06K 9/00033 382/124 |
| 2015/0235098 A1* | 8/2015 | Lee | G06F 3/0484 715/709 |
| 2015/0296607 A1* | 10/2015 | Yang | G01L 1/205 361/750 |
| 2015/0296622 A1* | 10/2015 | Jiang | G01L 1/2268 361/750 |
| 2015/0324569 A1* | 11/2015 | Hong | G06F 21/32 345/174 |
| 2015/0334859 A1* | 11/2015 | Lee | H05K 5/0217 361/749 |
| 2016/0034741 A1* | 2/2016 | Lan | G06K 9/00 382/124 |
| 2016/0063230 A1* | 3/2016 | Alten | G06F 21/32 |
| 2016/0232395 A1* | 8/2016 | Han | G06K 9/0002 |
| 2016/0246396 A1* | 8/2016 | Dickinson | G06F 3/03545 |
| 2016/0261590 A1* | 9/2016 | Pierce | G06F 16/5838 |
| 2016/0370866 A1* | 12/2016 | Hwang | G06F 3/017 |
| 2017/0024553 A1* | 1/2017 | Chang | G06F 21/32 |
| 2017/0046556 A1* | 2/2017 | Kim | G06F 3/04883 |
| 2017/0147800 A1* | 5/2017 | Huang | G06F 21/32 |
| 2017/0220838 A1* | 8/2017 | He | G06K 9/0004 |
| 2017/0270342 A1* | 9/2017 | He | G06F 3/0412 |
| 2017/0316248 A1* | 11/2017 | He | G06K 9/00006 |
| 2017/0336909 A1* | 11/2017 | Song | G06F 3/0416 |
| 2018/0005005 A1* | 1/2018 | He | G06F 3/0412 |
| 2018/0047014 A1* | 2/2018 | Maus | G06Q 20/30 |
| 2018/0129798 A1* | 5/2018 | He | G06K 9/00013 |
| 2018/0144111 A1* | 5/2018 | Katingari | G06F 3/0416 |
| 2018/0260602 A1* | 9/2018 | He | G06K 9/0008 |
| 2018/0267666 A1* | 9/2018 | Park | G06F 3/0412 |
| 2018/0300526 A1* | 10/2018 | Cho | G06K 9/00013 |
| 2018/0307884 A1* | 10/2018 | Xu | H01L 27/323 |
| 2019/0258840 A1* | 8/2019 | Dunlap | G01N 27/221 |

* cited by examiner

ELECTRONIC DEVICE

CROSS-REFERENCE TO RELATED APPLICATION(S)

This application claims the benefit under 35 U.S.C. § 119(a) of a Korean patent application filed on Apr. 29, 2015 in the Korean Intellectual Property Office and assigned Serial number 10-2015-0060451, the entire disclosure of which is hereby incorporated by reference.

TECHNICAL FIELD DISCLOSURE

The present disclosure relates to an electronic device that can detect an input using a fingerprint recognition sensor and a touch sensor.

BACKGROUND

Recently, electronic devices such as a smart phone, tablet personal computer (PC), desktop PC, portable multimedia player (PMP), Moving Picture Experts Group phase 1 or phase 2 (MPEG-1 or MPEG-2) audio layer-3 (MP3) player, or wearable device have been widely used by users, and the users may encounter various content through such various electronic devices.

Recent electronic devices provide a touch-based input device such as a touch pad as well as a physical key or button. Further, electronic devices using a user fingerprint as a means for reinforcing security of an electronic device as an input means are becoming available. Fingerprint recognition technology of such an electronic device is generally used for preventing a security accident according to user registration and authentication, and various electronic devices provide a new user interface (UI) using a fingerprint recognition sensor.

Accordingly, users can use more conveniently and easily various functions of the electronic device using various input means such as a touch input and fingerprint recognition in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that can integrally manage a touch sensor and a fingerprint recognition sensor that detect an input with the same method.

Another aspect of the present disclosure is to provide an electronic device that can together control a touch sensor and a fingerprint recognition sensor through one input processor and one flexible circuit board.

Another aspect of the present disclosure is to provide an electronic device that can prevent cover glass thereof from being damaged.

Another aspect of the present disclosure is to provide an electronic device that can prevent electro static discharge (ESD) thereof.

In accordance with an aspect of the present disclosure, an electronic device is provided. The electronic device includes an input sensing module configured to detect at least two inputs and a processor configured to control the electronic device to perform a function corresponding to an input received through the input sensing module, wherein the input sensing module includes at least one fingerprint recognition sensor, at least one touch sensor, and an input processor electrically connected to the at least one fingerprint recognition sensor and the at least one touch sensor and configured to process an input received from the at least one fingerprint recognition sensor or the at least one touch sensor and transfer the input to the processor.

In accordance with another aspect of the present disclosure, an electronic device is provided. The electronic device includes an input sensing module including a flexible circuit board, at least one fingerprint recognition sensor and at least one touch sensor each electrically connected to the flexible circuit board, and an input processor configured to receive and process an input from the at least one fingerprint recognition sensor and at least one touch sensor through the flexible circuit board, a mounting structure in which the input sensing module is mounted, and a support structure that has space to house the mounting structure and that is located within the electronic device, wherein the mounting structure includes a casing that mounts the input processor, a circumferential edge portion physically divided from the casing and disposed to enclose a side surface of the input processor of the input sensing module, and cover glass stacked in an upper portion of the input sensing module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
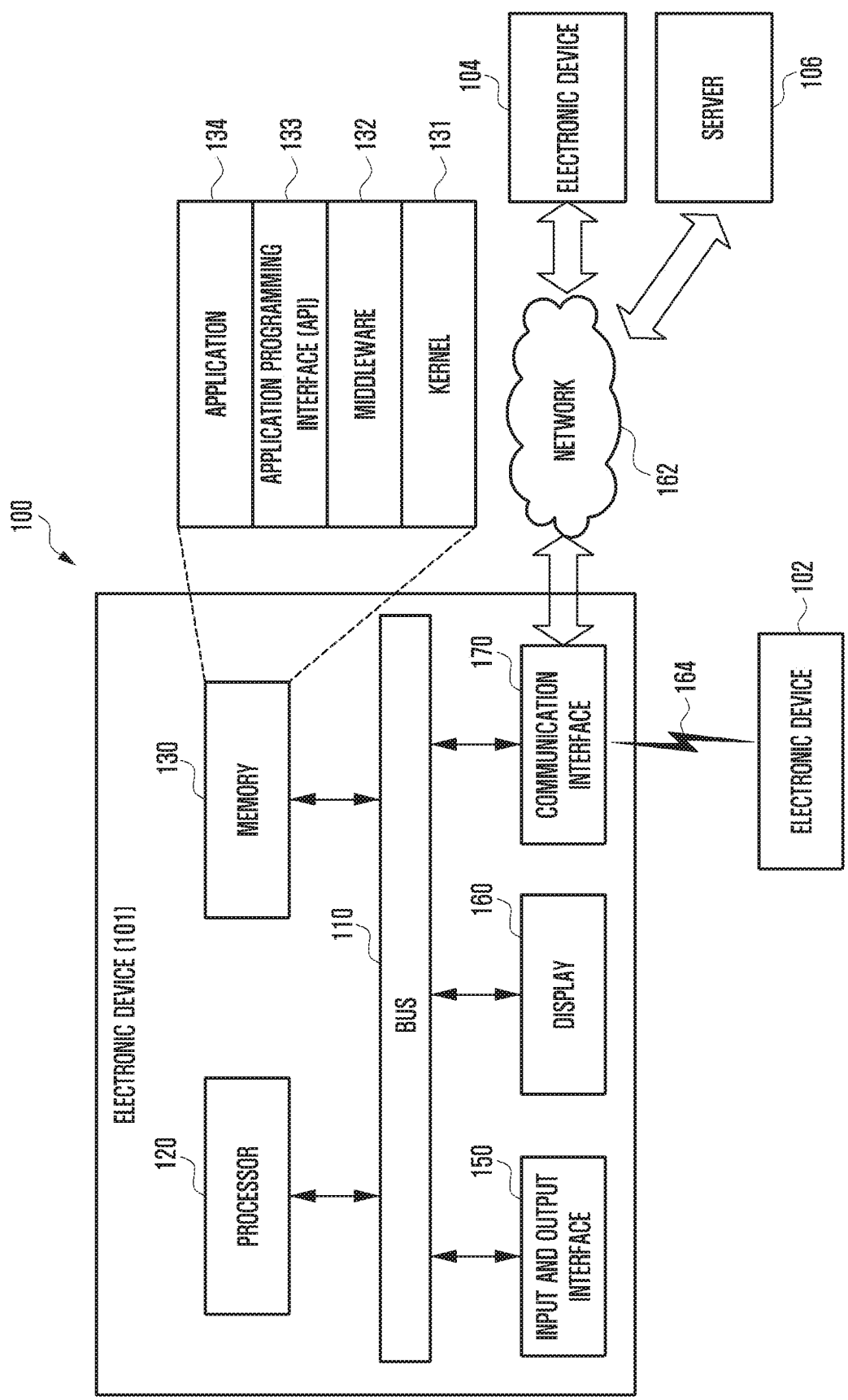
FIG. 1 is a block diagram illustrating a configuration of an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or" "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," and/or the like, may modify various elements. However, such elements are not limited by the above expressions. For example, the above expressions do not limit the sequence and/or importance of the elements. The above expressions are used merely for distinguishing an element from the other elements. For example, a first user device and a second user device indicate different user devices although both of the first user device and the second user device are user devices. Similarly, a first element could be termed a second element, and similarly, a second element could be also termed a first element without departing from the scope of the present disclosure.

When a component is referred to as being "connected" or "accessed" to other component, it should be understood that not only the component is directly connected or accessed to the other component, but also there may exist another component between the component and the other component. On the other hand, when a component is referred to as being "directly connected" or "directly accessed" to another component, it should be understood that there is no component therebetween.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (e.g., an air-conditioner, vacuum, an oven, a microwave, a washing machine, an air cleaner, and/or the like), an artificial intelligence robot, a television (TV), a digital versatile disc (DVD) player, an audio device, various medical devices (e.g., magnetic resonance angiography (MRA), magnetic resonance imaging (MRI), computed tomography (CT), a scanning machine, an ultrasonic wave device, and/or the like), a navigation device, a global positioning system (GPS) receiver, an event data recorder (EDR), a flight data recorder (FDR), a set-top box, a TV box (e.g., Samsung HomeSync™, Apple TV™, or Google TV™), an electronic dictionary, vehicle infotainment device, an electronic equipment for a ship (e.g., navigation equipment for a ship, gyrocompass, and/or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and/or the like. It is obvious to those skilled in the art that the electronic device according to the present disclosure is not limited to the aforementioned devices.

According to various embodiments of the present disclosure, an electronic device supporting short-range communication may support a master-single slave connection, a master-multi slave connection, and a scatternet connection. The electronic device may be a device restrictively operated by the master-single slave connection, for example, a wearable device or an accessory electronic device, but the electronic device of the present disclosure is not limited thereto.

FIG. 1 is a block diagram illustrating a configuration of an electronic device according to an embodiment of the present disclosure.

Referring to FIG. 1, a network environment 100 may include the electronic device 101, other electronic devices 102 and 104, and a server 106. The electronic device 101 may include a bus 110, a processor 120, a memory 130, a user input module 150, a display module 160, a communication interface 170 and other similar and/or suitable components.

The bus 110 may be a circuit which interconnects the above-described elements and delivers a communication (e.g. a control message) between the above-described elements.

The processor 120 may receive commands from the above-described other elements (e.g., the memory 130, the user input module 140, the display module 150, the communication module 160, the communication configuration control module 170, etc.) through the bus 110, may interpret the received commands, and may execute calculation or data processing according to the interpreted commands.

The memory 130 may store commands or data received from the processor 120 or other elements (e.g., the user input module 140, the display module 150, the communication module 160, etc.) or generated by the processor 120 or the other elements. The memory 130 may include programming modules, such as a kernel 131, a middleware 132, an application programming interface (API) 133, an application 134, and the like. Each of the above-described programming modules may be implemented in software, firmware, hardware, or a combination of two or more thereof.

The kernel 131 may control or manage system resources (e.g., the bus 110, the processor 120, the memory 130, etc.) used to execute operations or functions implemented by other programming modules (e.g., the middleware 132, the API 133, and the application 134). In addition, the kernel 131 may provide an interface capable of accessing and controlling or managing the individual elements of the electronic device 100 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. For example, the middleware 132 may be configured to be an intermediary for communication between the API 133 or the application 134 and the kernel 131. In addition, in relation to work requests received from one or more applications 134 and/or the middleware 132, for example, may perform load balancing of the work requests by using a method of assigning a priority, in which system resources (e.g. the bus 110, the processor 120, the memory 130, etc.) of the electronic device 100 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, and/or the like.

The applications 134 may include, for example, a home application, a dialer application, a short message service (SMS)/multimedia message service (MMS) application, an instant message (IM) application, a browser application, a camera application, an alarm application, a contact application, a voice dial application, an electronic mail (e-mail) application, a calendar application, a media player application, an album application, a clock application, and any other suitable and/or similar application.

The user input module 150 may receive a command or data as input from a user via input-output means (e.g., sensor, keyboard, touchscreen, and/or the like) and may deliver the received command or data to the processor 120 or the memory 130 through the bus 110. The display module 160 may display a video, an image, data, and/or the like to the user.

The display module 160 may display the received various information (e.g., multi-media data, text data) from the above-described elements.

The communication interface 170 may control a short-range communication connection with another electronic device 102. When the electronic device 100 is paired with another electronic device, the communication interface 170 may stop a scan operation of waiting for reception of a signal from a neighboring electronic device or a broadcasting operation of broadcasting a signal. For example, in response to the electronic device 100 being paired with another electronic device 102, the communication interface 170 stop a scan operation of waiting for reception of a signal from a neighboring electronic device or a broadcasting operation of broadcasting a signal. When the electronic device 101 is paired with another electronic device, the communication interface 170 may control a cycle of the scan or broadcasting operation. Additional information on the communication configuration control module 170 is described below with respect to FIG. 2.

According to various embodiments of the present disclosure, the electronic device 100 may communicate with another electronic device using the communication interface 170. For example, the communication 170 may communicate with another electronic device 104, a server 164, and/or the like. The communication module 160 may communicate with the other electronic device 104, the server 106, and/or the like directly or through a network 162. For example, the communication module 160 may operate to connect the electronic device 100 to the network 162.

Figure 2:
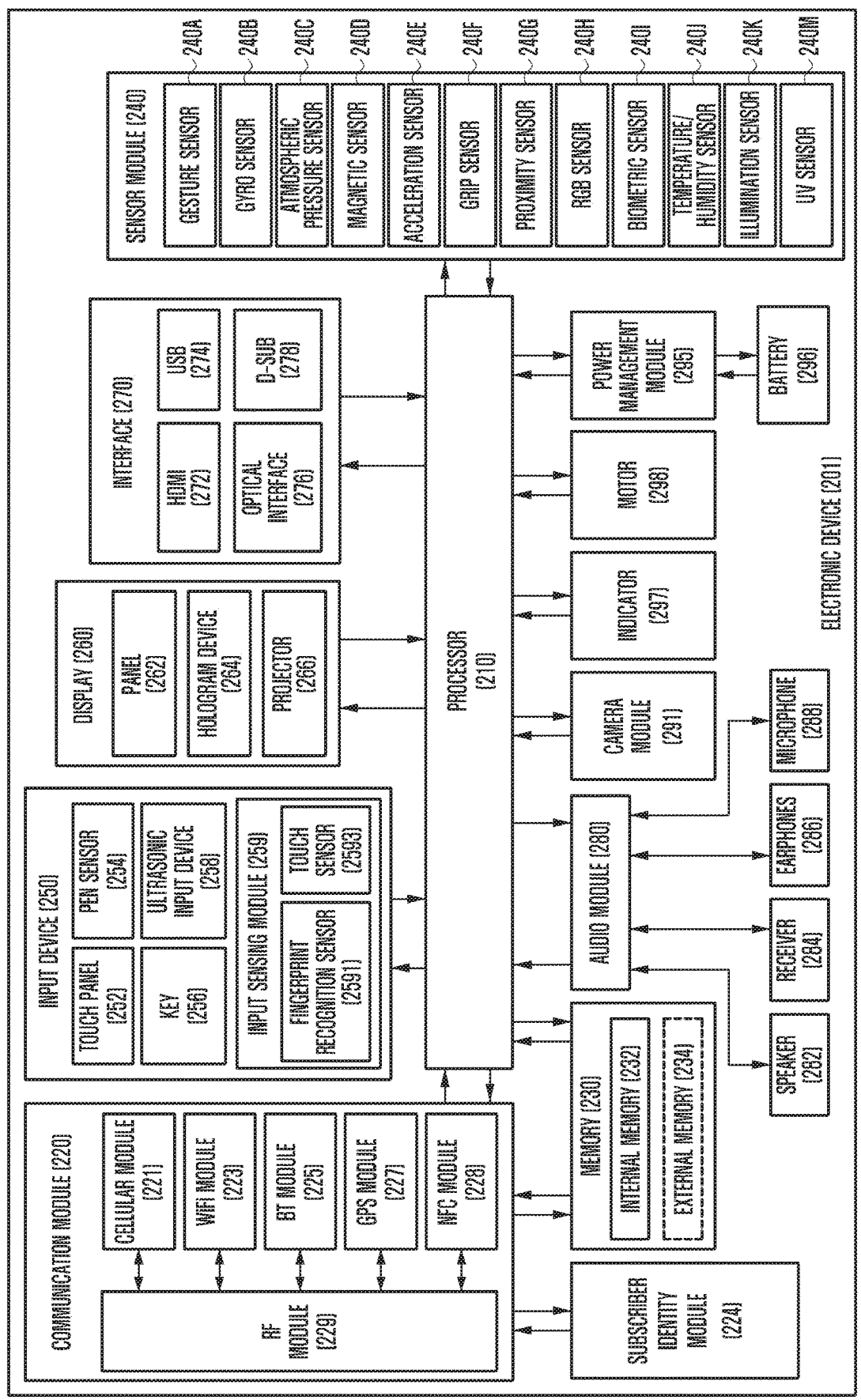
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, the electronic device 200 may be, for example, the electronic device 100 illustrated in FIG. 1. As illustrated in FIG. 2, the hardware 200 may include one or more application processors (APs) 210, a subscriber identification module (SIM) card 224, a communication module 220, a memory 230, a sensor module 240, an input module 250, a display module 260, an interface 270, an audio module (e.g., audio coder/decoder (codec)) 280, a camera module 291, a power management module 295, a battery 296, an indicator 297, a motor 298 and any other similar and/or suitable components.

The AP 210 (e.g., the processor) may include one or more APs, or one or more communication processors (CPs).

The AP 210 may execute an operating system (OS) or an application program, and thereby may control multiple hardware or software elements connected to the AP 210 and may perform processing and arithmetic operations on various data including multimedia data. The AP 210 may be implemented by a system on chip (SoC). According to various embodiments of the present disclosure, the AP 210 may further include a graphics processing unit (GPU) (not illustrated).

The SIM card 224 may be a card implementing a subscriber identification module, and may be inserted into a slot formed in a particular portion of the electronic device 100. The SIM card 224 may include unique identification information (e.g., integrated circuit card identifier (ICCID)) or subscriber information (e.g., international mobile subscriber identity (IMSI)).

The communication module 220 may be the communication interface 170 illustrated in FIG. 1. The communication module 220 may include a radio frequency (RF) module 229. The communication module 220 may further include a cellular module 221, a Wi-Fi module 223, a Bluetooth (BT)

module 225, a GPS module 227, and a near field communication (NFC) module 228. The communication module 220 may provide a wireless communication function by using a radio frequency. Additionally or alternatively, the communication module 220 may include a network interface (e.g., a local area network (LAN) card), a modulator/demodulator (modem), and the like for connecting the hardware 200 to a network (e.g., the Internet, a LAN, a wide area network (WAN), a telecommunication network, a cellular network, a satellite network, a plain old telephone service (POTS), and/or the like).

The cellular module 221 may further include a CP. The CP may control the transmission and reception of data by the communication module 220. As illustrated in FIG. 2, the elements such as the CP, the power management module 295, the memory 230, and the like are illustrated as elements separate from the AP 210. However, according to various embodiments of the present disclosure, the AP 210 may include at least some (e.g., the CP) of the above-described elements. The CP may manage a data line and may convert a communication protocol in the case of communication between the electronic device (e.g., the electronic device 100) including the hardware 200 and different electronic devices connected to the electronic device through the network.

The RF module 229 may be used for transmission and reception of data, for example, transmission and reception of RF signals or called electronic signals. Although not illustrated, the RF unit 229 may include a transceiver, a power amplifier module (PAM), a frequency filter, a low noise amplifier (LNA), and/or the like.

In addition, the RF module 229 may further include a component for transmitting and receiving electromagnetic waves in a free space in a wireless communication, for example, a conductor, a conductive wire, or the like.

The memory 230 may include an internal memory 232 and an external memory 234. The memory 230 may be, for example, the memory 130 illustrated in FIG. 1. According to various embodiments of the present disclosure, internal memory 232 may include, for example, at least one of a volatile memory (e.g., a dynamic random access memory (DRAM), a static RAM (SRAM), a synchronous dynamic RAM (SDRAM), and/or the like), and a non-volatile memory (e.g., a one time programmable read-only memory (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, and/or the like). According to various embodiments of the present disclosure, the internal memory 232 may be in the form of a solid state drive (SSD). The external memory 234 may further include a flash drive, such as a compact flash (CF), a secure digital (SD), a micro-SD, a mini-SD, an extreme digital (xD), a memory stick, and/or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and an ultra violet (UV) sensor 240M. The sensor module 240 may measure a physical quantity and/or may detect an operating state of the electronic device 100, and may convert the measured or detected information to an electrical signal. The sensor module 240 may also include an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and/or the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and/or the like. The sensor module 240 may further include a control circuit (not illustrated) for controlling one or more sensors included therein.

The input device 250 may include a touch panel 252, (digital) pen sensor 254, key 256, ultrasonic input device 258, or input sensing module 259.

The touch panel 252 may use at least one method of a capacitive, resistive, infrared ray method, or ultrasonic wave method. The touch panel 252 may further include a control circuit. The touch panel 252 may further include a tactile layer to provide a tactile sense reaction to a user.

The (digital) pen sensor 254 may include, for example, a portion of the touch panel 252 or a separate recognition sheet. The key 256 may include a physical button, optical key, or keypad. The ultrasonic input device 258 may detect an ultrasonic wave that has occurred in an input instrument through a microphone (e.g., a microphone 288) and determine data corresponding to the detected ultrasonic wave.

The input sensing module 259 may include at least one fingerprint recognition sensor 2591 and at least one touch sensor 2593. The input sensing module 259 may include the fingerprint recognition sensor 2591 and the touch sensor 2593 that detect an input with the same sensing method. For example, both the fingerprint recognition sensor 2591 and the touch sensor 2593 of the input sensing module 259 may detect an input with a capacitive method. The input sensing module 259 may include an input processor electrically connected to the fingerprint recognition sensor 2591 and the touch sensor 2593 and that processes an input received from the fingerprint recognition sensor 2591 or the touch sensor 2593 and that transfers the processed input to the processor. The input sensing module 259 may include a flexible circuit board, and the touch sensor 2593, the fingerprint recognition sensor 2591, and the input processor of the input sensing module 259 may be electrically connected to the flexible circuit board. The input sensing module 259 may be disposed at a location corresponding to a lower end key (e.g., a home key or a soft key) of a front portion of the electronic device. For example, the input sensing module 259 may detect a user's fingerprint input or touch input received from a home key or a soft key through the touch sensor 2593 or the fingerprint recognition sensor 2591. The input sensing module 259 may detect a touch input received through a touch input area formed in a side surface portion of the electronic device using the touch sensor 2593 and detect a fingerprint input received using a home key through the fingerprint recognition sensor 2591. The input sensing module 259 may process a received input and transfer the processed input to the processor. The input processor and the fingerprint recognition sensor 2591 may be formed in one chip form.

The display module 260 may include a panel 262, a hologram 264, a projector 266, and the like. The display module 260 may be, for example, the display module 150 illustrated in FIG. 1. The panel 262 may be a liquid crystal display (LCD) and an active matrix organic light emitting diode (AM-OLED) display, and the like. The panel 262 may be implemented so as to be flexible, transparent, or wearable. The panel 262 may include the touch panel 252 and one module. The hologram 264 may display a three-dimensional image in the air by using interference of light. According to various embodiments of the present disclosure, the display module 260 may further include a control circuit for controlling the panel 262 or the hologram 264.

The interface module 270 may include a high-definition multimedia interface (HDMI) module 272, a universal serial bus (USB) module 274, an optical interface module 276, a D-subminiature (D-SUB) module 278, and the like. Additionally or alternatively, the interface 270 may include, for example, one or more interfaces for SD/multimedia card (MMC) (not shown) or infrared data association (IrDA) (not shown). The interface module 270 or any of its sub-modules may be configured to interface with another electronic device (e.g., an external electronic device), an input device, an external storage device, and/or the like.

The audio module 280 may encode/decode voice into electrical signal, and vice versa. The audio module 280 may encode/decode voice information that are input into, or output from, a speaker 282, a receiver 284, an earphone 286, and/or a microphone 288.

The camera module 291 may capture still images or video. According to various embodiments of the present disclosure, the camera module 291 may include one or more image sensors (e.g., front sensor module or rear sensor module; not shown), an image signal processor (ISP, not shown), or a flash LED, not shown.

The power management module 295 may manage electrical power of the hardware 200. Although not shown, the power management module 295 may include a power management IC (PMIC), a charger IC, a battery fuel gauge, and/or the like.

The PMIC may be disposed in an IC or an SoC semiconductor. The charging method for the hardware 200 may include wired or wireless charging. The charger IC may charge a battery, or prevent excessive voltage or excessive current from a charger from entering the hardware 200. According to various embodiments of the present disclosure, the charger IC may include at least one of a wired charger IC or a wireless charger IC. The wireless charger IC may be a magnetic resonance type, a magnetic induction type or an electromagnetic wave type, and may include circuits such as, for example, a coil loop, a resonance circuit or a rectifier.

The battery gauge may measure a charge level, a voltage while charging, a temperature of battery 296, and the like. The battery 296 may supply power to, for example, the hardware 200. The battery 296 may be a rechargeable battery.

The indicator 297 may indicate one or more states (e.g., boot status, message status, or charge status) of the hardware 200 or a portion thereof (e.g., the AP 211). The motor 298 may convert electrical signal into mechanical vibration.

Although not illustrated, the hardware 200 may include a processing unit (e.g., a GPU) for supporting a module TV. The processing unit for supporting a module TV may process media data according to standards such as, for example, digital multimedia broadcasting (DMB), digital video broadcasting (DVB), media flow, and/or the like.

According to various embodiments of the present disclosure, each of the above-described elements of the hardware 200 may include one or more components, and the name of the relevant element may change depending on the type of electronic device. According to various embodiments of the present disclosure, the hardware 200 may include at least one of the above-described elements. Some of the above-described elements may be omitted from the hardware 200, or the hardware 200 may further include additional elements. In addition, according to various embodiments of the present disclosure, some of the elements of the hardware 200 may be combined into one entity, which may perform functions identical to those of the relevant elements before the combination.

Figure 3:
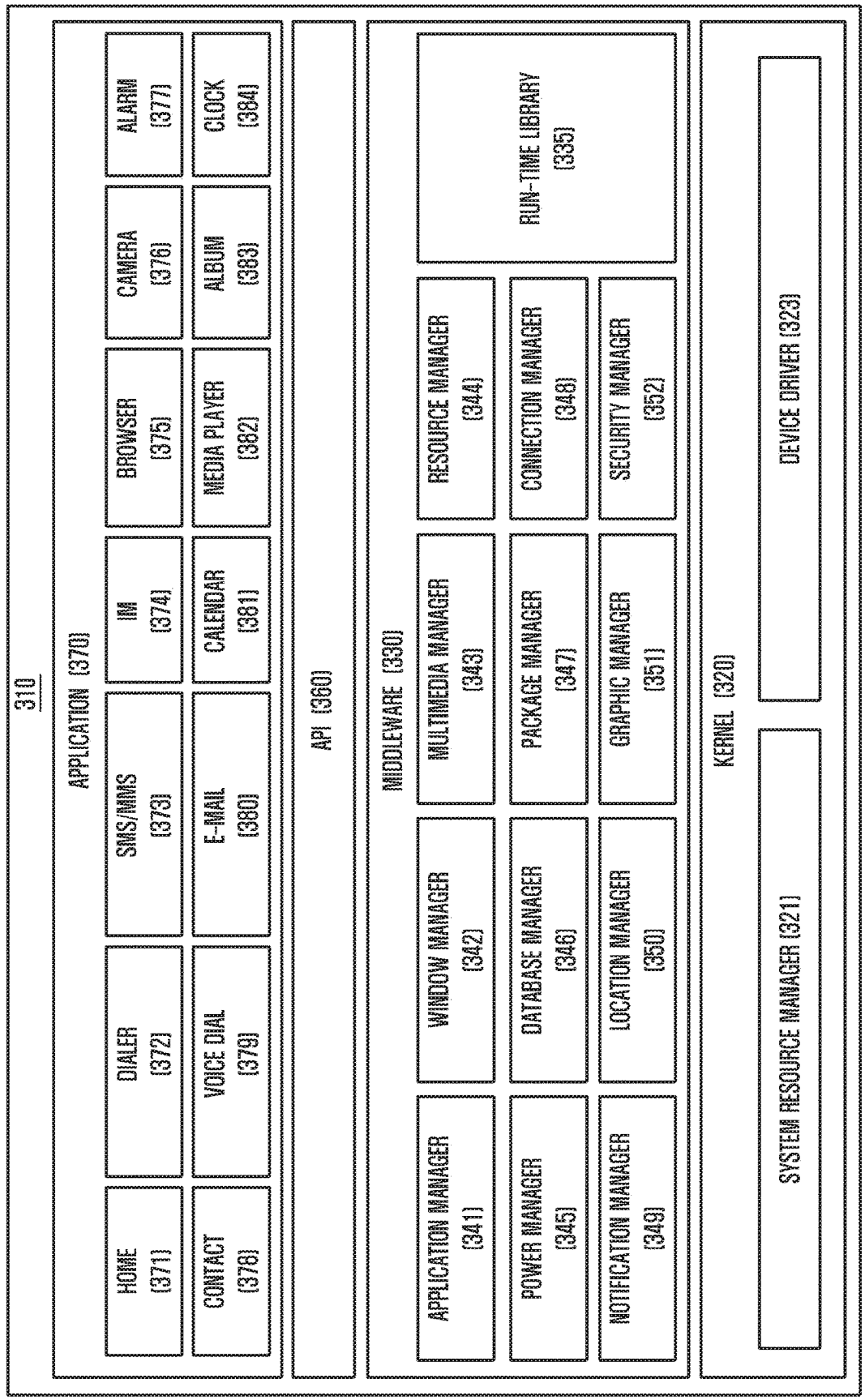
FIG. 3 is a block diagram illustrating a configuration of a program module according to an embodiment of the present disclosure.

FIG. 3 is a block diagram illustrating a configuration of a programming module according to an embodiment of the present disclosure.

Referring to FIG. 3, the programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 131) may include a system resource manager 321 and/or a device driver 322. The system resource manager 321 may include a process manager (not illustrated), a memory manager (not illustrated), and a file system manager (not illustrated). The system resource manager 321 may perform the control, allocation, recovery, and/or the like of system resources. The device driver 322 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. The middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a compiler, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a UI related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. The middleware 330 may also dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, an SMS/MMS application 373, an IM application 374, a browser application 375, a camera application 376, an alarm application 377, a contact application 378, a voice dial application 379, an e-mail application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Figure 4:
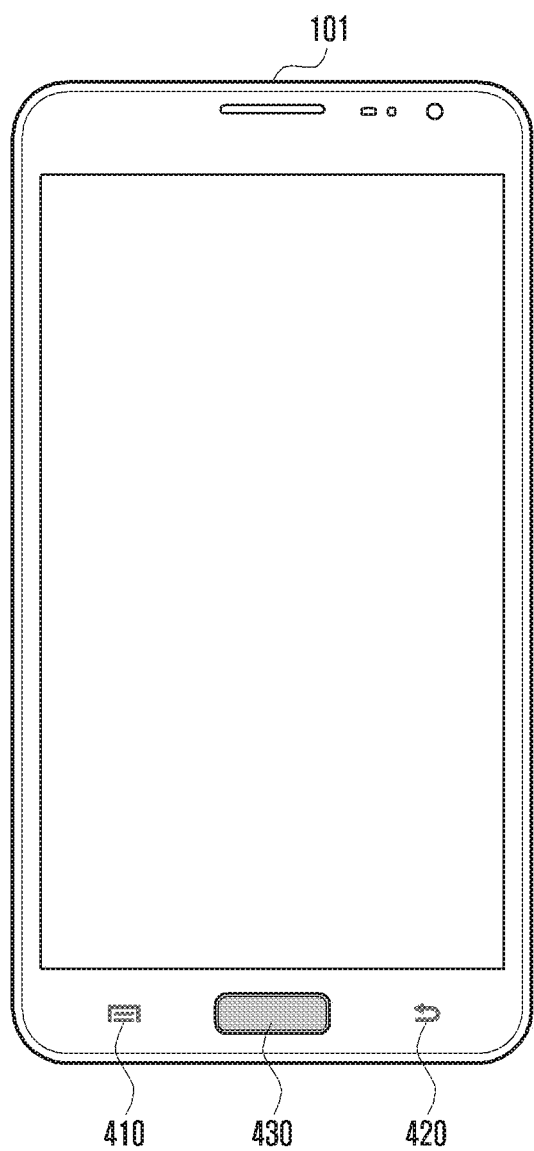
FIG. 4 is a diagram illustrating an electronic device according to an embodiment of the present disclosure.

FIG. 4 is a diagram illustrating an electronic device according to an embodiment of the present disclosure.

Referring to FIG. 4, the electronic device 101 may have a touch screen area, home key forming area, and soft key forming area in a front portion. According to an embodiment, in the electronic device 101, a home key 430 is disposed at the center of the lower end of a front portion thereof, and soft keys 410 and 420 may be disposed at the left side and the right side, respectively, about the home key 430. The fingerprint recognition sensor 2591 may be disposed at a location corresponding to the home key forming area of the electronic device 101, and the touch sensor 2593 may be disposed at a location corresponding to the soft key forming area. The electronic device 101 may detect a user fingerprint through the home key 430 and detect a touch input through the soft keys 410 and 420 of the left side and the right side. The electronic device 101 may receive a user's fingerprint input or touch input through the home key 430 or the soft keys 410 and 420 formed in a front portion thereof and provide a function corresponding to the received fingerprint input or touch input.

Figure 5A:
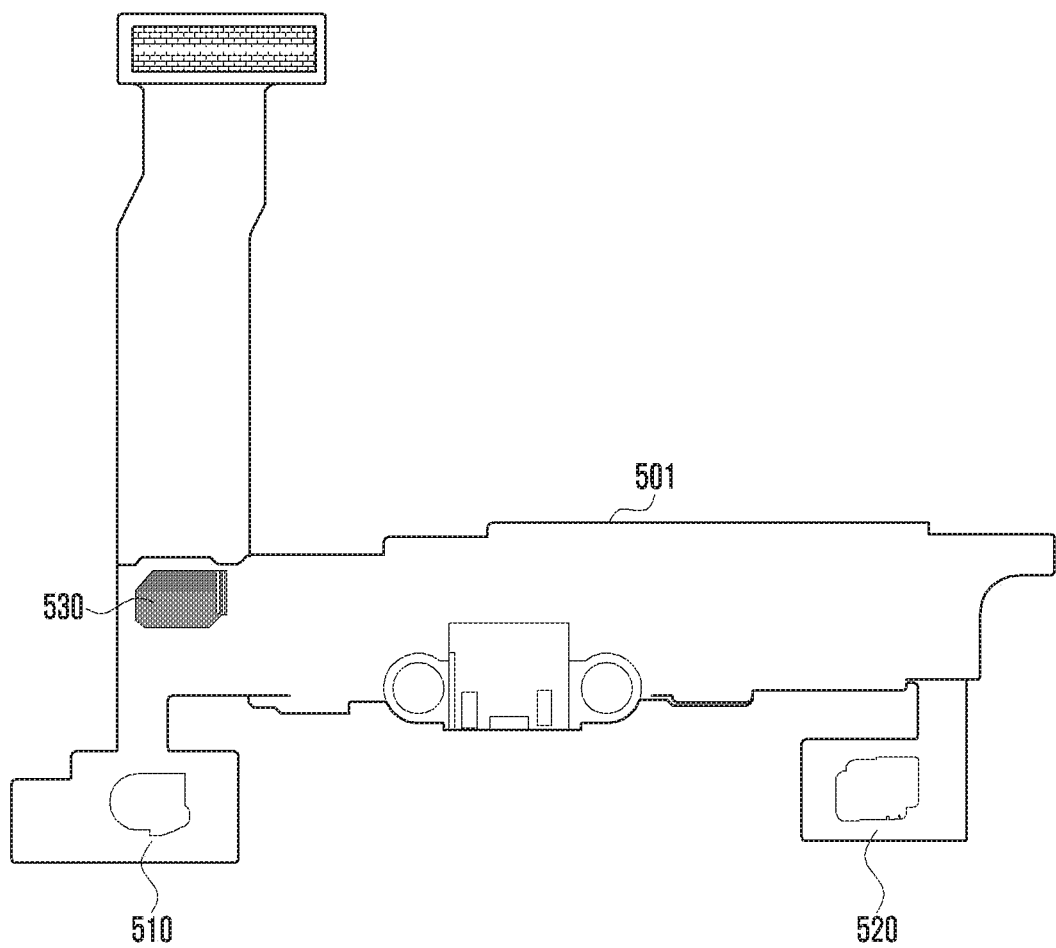
FIGS. 5A and 5B are diagrams illustrating a structure of a fingerprint recognition sensor and touch sensor according to the related art.
Figure 5B:
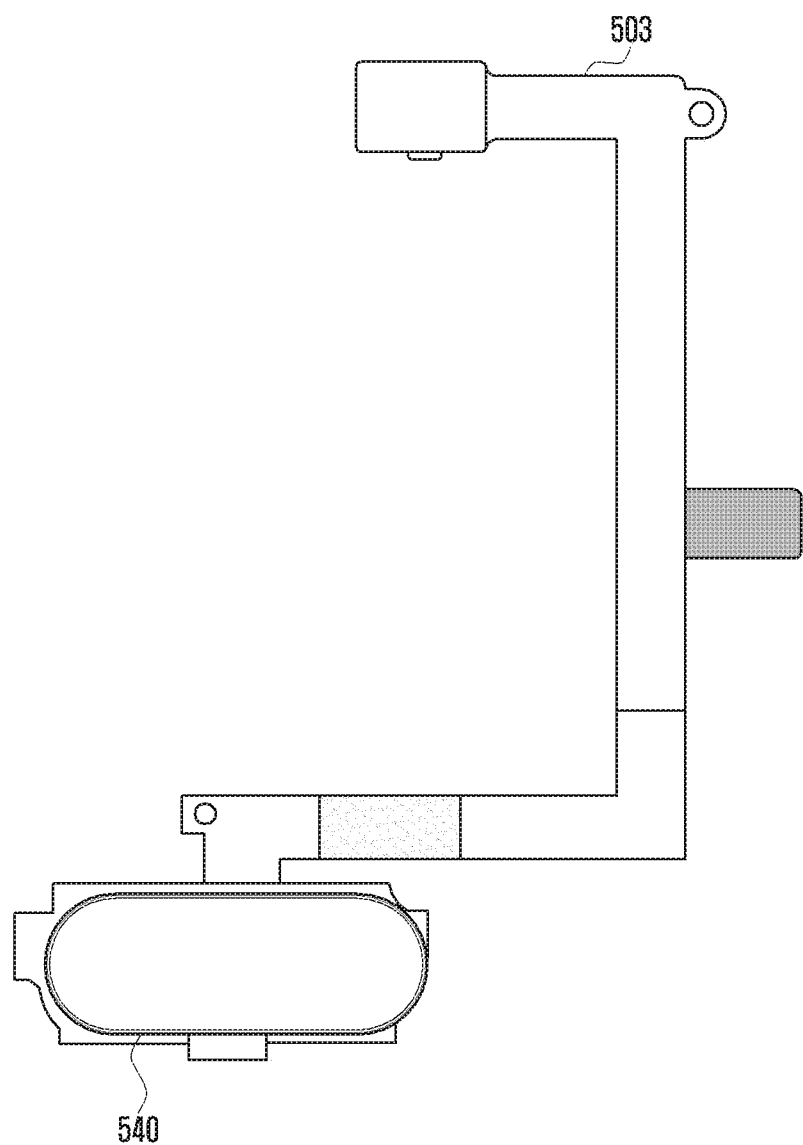

FIGS. 5A and 5B are diagrams illustrating a structure of a fingerprint recognition sensor and touch sensor according to the related art.

FIGS. 5A and 5B illustrate a structure of respective flexible circuit boards included in an electronic device of the related art separately having a flexible circuit board to which a fingerprint recognition sensor is connected and a flexible circuit board to which a touch sensor is connected.

FIG. 5A illustrates a flexible circuit board 501 to which two touch sensors 510 and 520 are electrically connected. The touch sensors 510 and 520 and a touch sensor controller (e.g., a driving chip of the touch sensor) 530 for controlling the touch sensors 510 and 520 are mounted in the flexible circuit board 501.

FIG. 5B illustrates a flexible circuit board 503 to which a fingerprint recognition sensor 540 is electrically connected. A fingerprint recognition sensor controller (e.g., a driving chip of the fingerprint recognition sensor 540) for controlling the fingerprint recognition sensor 540 separately from the touch sensor controller 530 of FIG. 5A is mounted in the flexible circuit board 503. Alternatively, the fingerprint recognition sensor 540 controls operation of the fingerprint recognition sensor 540 regardless of the touch sensor controller 530.

In a case of the related art, the touch sensors 510 and 520 and the fingerprint recognition sensor 540 are mounted on the respective flexible circuit boards 501 and 503, and operations thereof are controlled using the respective driving chips 530 and 540. Accordingly, in the electronic device, as the touch sensors 510 and 520 and the fingerprint recognition sensor 540 adjacently disposed and operating with the same method are formed on the different flexible circuit boards 501 and 503, there is a problem that a production cost increases and hardware is inefficiently designed. Further, in a processing process, it is difficult to implement an additional function or module on the flexible circuit board using a method of performing a surface mounting technology (SMT) processing of a sensor on a flexible circuit board and molding a plurality of arrays.

An electronic device according to various embodiments of the present disclosure implements at least one touch sensor and at least one fingerprint recognition sensor through one flexible circuit board and one input processor (e.g., one sensor driving chip), thereby preventing the problem.

Figure 6:
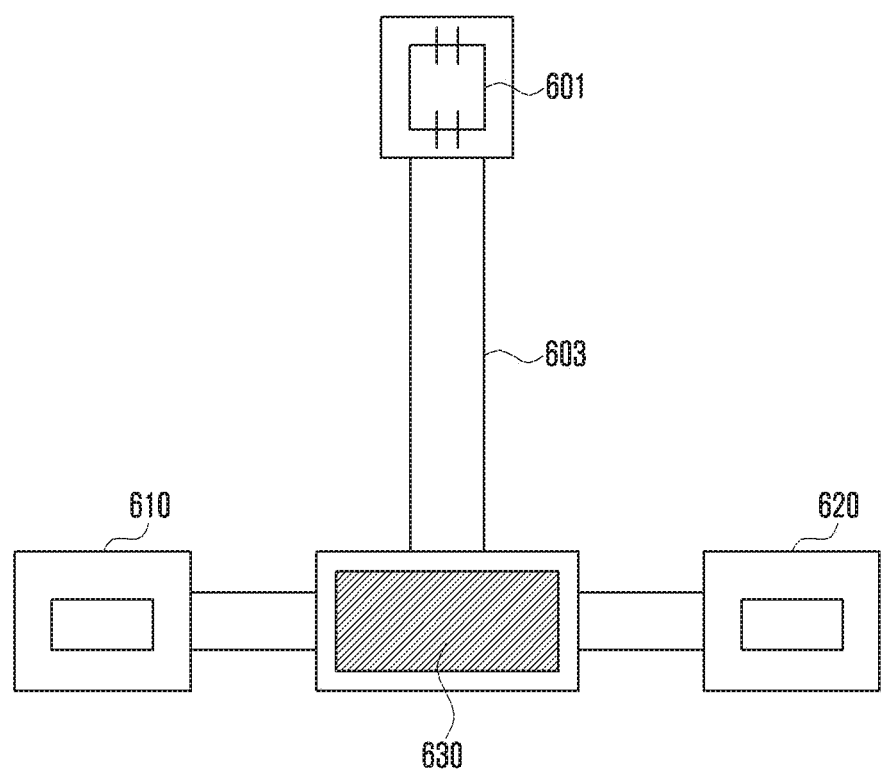
FIG. 6 is a diagram illustrating a structure of an input sensing module according to an embodiment of the present disclosure.

FIG. 6 is a diagram illustrating a structure of an input sensing module 259 according to an embodiment of the present disclosure.

Referring to FIG. 6, the input sensing module 259 may include a flexible circuit board 601, fingerprint recognition sensor 2591, touch sensors 610 and 620, and input processor 630. According to an embodiment, the fingerprint recognition sensor 2591 may be formed integrally with the input processor 630. For example, the fingerprint recognition sensor 2591 and the input processor 630 may be formed in one sensor chip. For example, the input processor 630 of the electronic device is a sensor chip that detects a user fingerprint with a capacitive method and may process a signal received from a touch sensor that detects a touch input with the same capacitive method.

FIG. 6 is a diagram illustrating a plane structure of the input sensing module 259, and it is assumed that the fingerprint recognition sensor 2591 is disposed at the same location (e.g., when the fingerprint recognition sensor 2591 is disposed in an upper portion of the input processor 630 or is included in the input processor 630) as that of the input processor 630 and thus the fingerprint recognition sensor 2591 is not separately shown.

According to an embodiment, the fingerprint recognition sensor 2591, the touch sensors 610 and 620, and the input processor 630 may be electrically connected to the flexible circuit board 601.

According to an embodiment, the input processor 630 may be mounted at the center of the flexible circuit board 601. The input processor 630 may process an input received from sensors and transmit the processed input to a processor. For example, the input processor 630 may be one sensor (driving) chip for driving a sensor.

The fingerprint recognition sensor 2591 may be mounted at an upper end portion of the input processor 630. According to an embodiment, the fingerprint recognition sensor 2591 may be implemented in an integral form with the input processor 630. The touch sensors 610 and 620 may be located at both sides of the left side and the right side about the input processor 630 (or the fingerprint recognition sensor 2591). For example, the touch sensors 610 and 620 may be mounted on the flexible circuit board 601 connected to the left side and the right side from a location in which the input processor 630 is mounted.

According to an embodiment, at the flexible circuit board 601, a connector 603 that can connect the flexible circuit board 601 to other constituent elements of the electronic device may be connected to a side surface (e.g., upper end) in which the input processor 630 is mounted. The input processor 630 may process an input detected by the touch sensors 610 and 620 or the fingerprint recognition sensor 2591 and transfer the processed input to the processor through the connector 603 electrically connected to the flexible circuit board 601.

Figure 7:
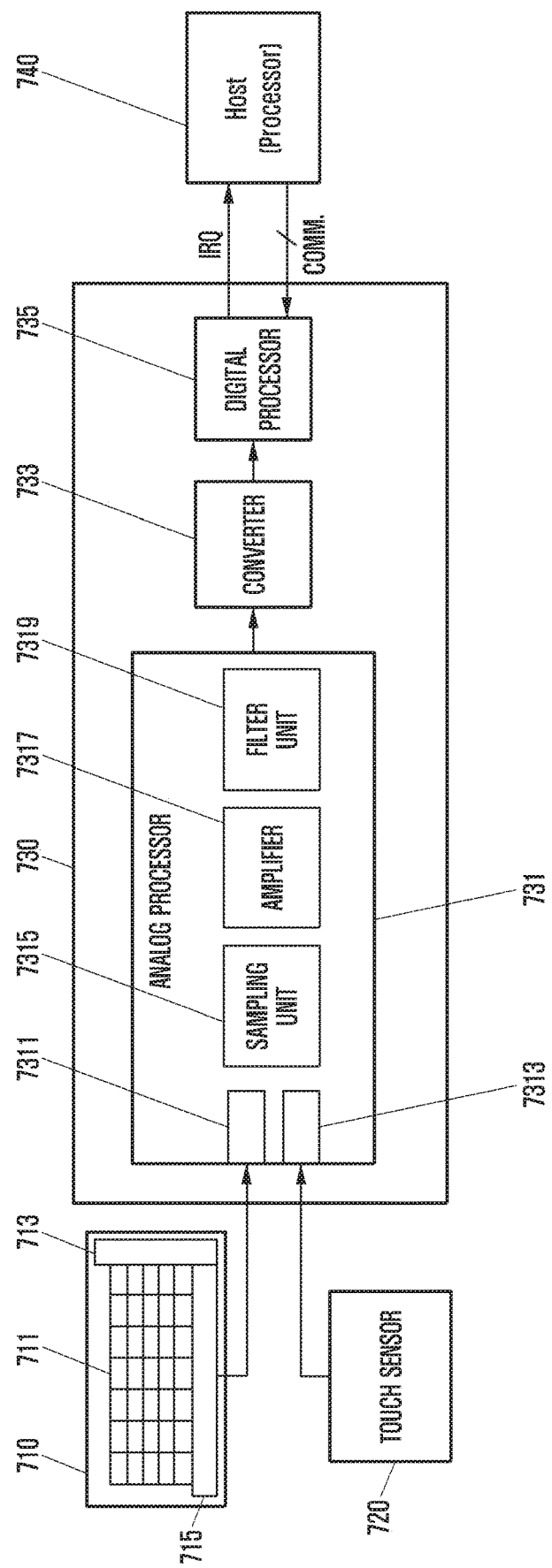
FIG. 7 is a block diagram illustrating a configuration of an input sensing module according to an embodiment of the present disclosure.

FIG. 7 is a block diagram illustrating a configuration of an input sensing module according to various embodiments of the present disclosure.

Referring to FIG. 7, according to various embodiments of the present disclosure, the input sensing module 259 may include a fingerprint recognition sensor 710, touch sensor 720, and input processor 730. When receiving an input from the fingerprint recognition sensor 710 or the touch sensor 720, the input sensing module 259 may transmit an interruption request signal to a host (e.g., a processor 740). The input sensing module 259 may communicate with the processor 740 to transmit and receive a signal. For example, the input sensing module 259 may transmit and receive a signal to and from the processor 740 using a serial peripheral interface bus (SPI) communication method.

Both the fingerprint recognition sensor 710 and the touch sensor 720 may sense an input with a capacitive method. For example, the fingerprint recognition sensor 710 may detect a user fingerprint with a capacitive method through a sensor array 711 arranged more minutely than the touch sensor 720, and the touch sensor 720 may detect a user touch input with a capacitive method.

The fingerprint recognition sensor 710 may include the sensor array 711, decoder 713, and multiplexer 715. The sensor array 711 may include electrodes constituting a plurality of columns and rows. When a user finger (fingerprint) contacts the fingerprint recognition sensor 710, the fingerprint recognition sensor 710 may sense a signal changing in electrodes of the sensor array 711 and recognize the user fingerprint. The decoder 713 may encode and output a drive input signal or a sensing input signal for sensing in electrodes constituting a row of the sensor array 711. The multiplexer 715 may selectively output signals sensed by the sensor array 711. The multiplexer 715 may transfer a signal according to a fingerprint input received from the sensor array 711 to the input processor 730.

The input processor 730 may include an analog processor 731, converter 733, and digital processor 735. The analog processor 731 may process an analog input signal received from at least one fingerprint recognition sensor 710 or at least one touch sensor 720. The analog processor 731 may perform an analog front end (AFE) function of the input processor 730.

The analog processor 731 may include a plurality of input terminals 7311 and 7313 that receive an input detected by a sensor, a sampling unit 7315, an amplifier 7317, and a filter unit 7319. The analog processor 731 may include input terminals 7311 and 7313 corresponding to respective sensors of the input sensing module 259. For example, the analog processor 731 may include a first input terminal 7311 that receives an input detected by the fingerprint recognition sensor 710 and a second input terminal 7313 that receives an input detected by the touch sensor 720.

The sampling unit 7315 may sample a signal transferred through the first input terminal 7311 or the second input terminal 7313. For example, the sampling unit 7315 may perform correlated double sampling (CDS) of an input signal received through the input terminals 7311 and 7313. The sampling unit 7315 may remove noise of a signal detected by the sensor through CDS, thereby enhancing accuracy of an input detected by the sensor.

The amplifier 7317 may include an amplifier for amplifying a signal. The amplifier 7317 may amplify a signal sampled by the sampling unit 7315. The filter unit 7319 may filter only a necessary portion from a signal amplified by the amplifier 7317. For example, the filter unit 7319 may remove a noise portion of the amplified signal.

The converter 733 may convert an analog signal output by the analog processor 731 to a digital signal. For example, the converter 733 may be an analog-digital converter (ADC).

The digital processor 735 may process the converted digital signal and transfer the processed signal to the processor 740. For example, when the digital processor 735 receives a digital signal from the converter 733, the digital processor 735 may transmit an interruption request signal to the processor 740. The digital processor 735 may communicate with the processor 740. The digital processor 735 may transmit and receive a digital signal to and from the processor 740 and transfer a signal corresponding to an input signal received from the touch sensor 720 or the fingerprint recognition sensor 710 to the processor 740.

Figure 8:
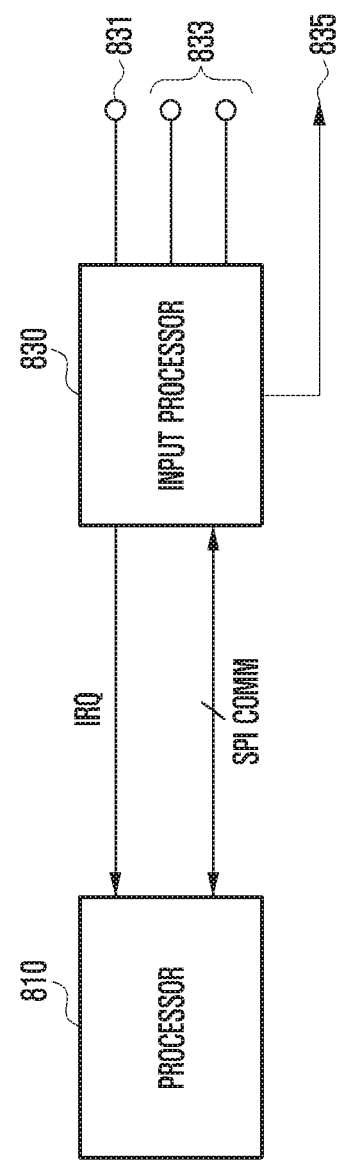
FIG. 8 is a schematic block diagram of an electronic device including an input sensing module according to an embodiment of the present disclosure.

FIG. 8 is a schematic block diagram of an electronic device including an input sensing module according to an embodiment of the present disclosure.

Referring to FIG. 8, according to an embodiment, the electronic device 201 may include the input sensing module 259 that detects a touch input or a fingerprint input and that processes the detected input and that transfers the processed input to a processor 810 and the processor 810 that performs a corresponding function through an input received from the input sensing module 259.

The input sensing module 259 may include at least one fingerprint recognition sensor 2591 and at least one touch sensor 2593 and an input processor 830 that processes an input received from the fingerprint recognition sensor 2591 or the touch sensor 2593 and that transfers the processed input to the processor 810. The input processor 830 may include terminals 831 and 833 in which respective sensors are connected to receive an input through the fingerprint recognition sensor 2591 and the touch sensor 2593. The input processor 830 may be electrically connected to the fingerprint recognition sensor 2591 and the touch sensor 2593 through the respective terminals 831 and 833. For example, when the electronic device 201 includes one fingerprint recognition sensor 2591 and two touch sensors 2593 corresponding to a home key and two soft keys, respectively, having in a front portion thereof, the input processor 830 may include a terminal 831 that receives an input from the fingerprint recognition sensor 2591 and two terminals 833 that receive an input from two touch sensors 2593.

The input processor 830 may determine whether a transferred input is a fingerprint input or a general touch input according to a terminal in which an input is transferred. For example, when the input processor 830 receives an input through the terminal 831 to which the fingerprint recognition sensor 2591 is connected, the input processor 830 may determine that the received input is a fingerprint input, process the received input, and transfer the processed input to the processor 810. Alternatively, when the input processor 830 receives an input through the terminal 833 to which a specific touch sensor 2593 is connected, the input processor 830 may determine that the received input is a touch input that is input through the corresponding touch sensor 2593, process the received input, and transfer the processed input to the processor 810.

When receiving an input from the fingerprint recognition sensor 2591 or the touch sensor 2593, the input processor 830 may transmit an interrupt request (IRQ) to the processor 810. The input processor 830 may transmit the IRQ and communicate with the processor 810. For example, the input processor 830 may process an input received from the sensor and transmit and receive a generated signal to and from the processor 810. The input processor 830 may perform SPI communication with the processor 810. For example, the input processor 830 may perform two-way communication with a full duplex method with the processor 810.

The input processor 830 may include a backlight unit that outputs light to a portion of the touch sensor 2593. The backlight unit may output light to a portion of the touch sensor 2593, thereby lighting a soft key area of a front portion of the electronic device 201. For example, in the electronic device 201, a specific pattern representing a corresponding soft key may be represented in a soft key area through light in which the backlight unit outputs. According to an embodiment, the input processor 830 may output a control signal 835 for controlling the backlight unit.

Figure 9A:
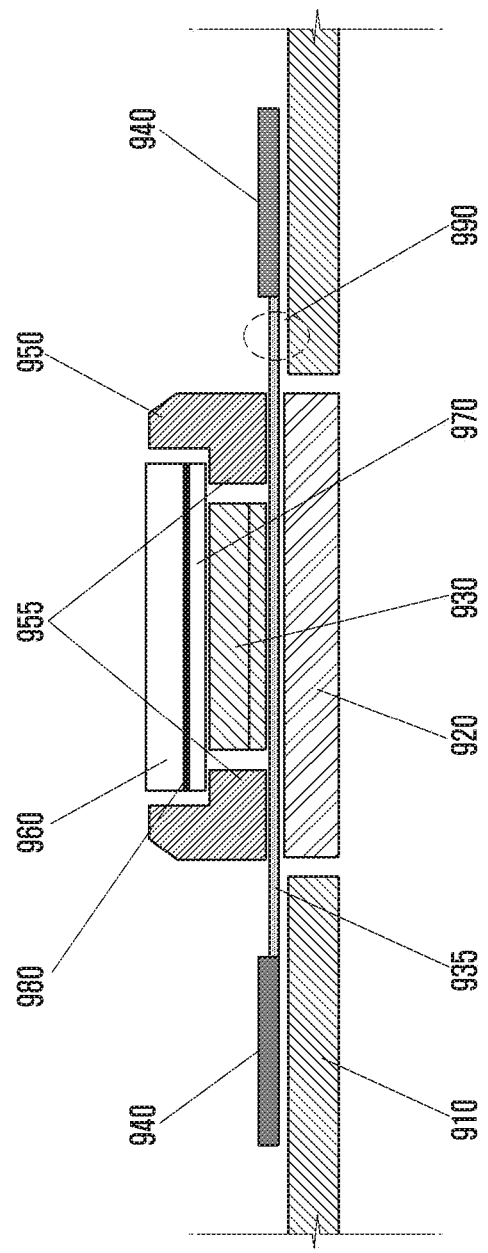
FIGS. 9A and 9B are cross-sectional views illustrating a portion of an electronic device according to an embodiment of the present disclosure.
Figure 9B:
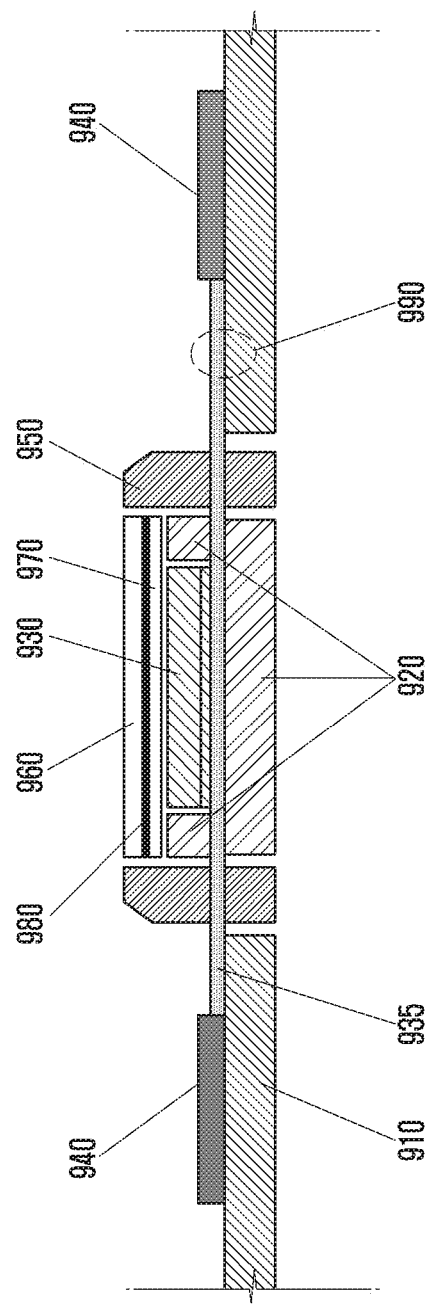

FIGS. 9A and 9B are cross-sectional views illustrating a portion of an electronic device according to various embodiments of the present disclosure. FIGS. 9A and 9B illustrate a portion of a cross-section of a lower end key area (e.g., an area in which a home key or a soft key of the screen lower end is formed) of the electronic device 201 according to various embodiments of the present disclosure.

Referring to FIG. 9A, the electronic device 201 may include an input sensing module, a mounting structure, and a support structure 910. The input sensing module may include a flexible circuit board 935, a fingerprint recognition sensor and touch sensor 940 each electrically connected to the flexible circuit board 935, and an input processor 930 that receives and processes an input from the fingerprint recognition sensor and the touch sensor 940 through the flexible circuit board 935. According to an embodiment, the fingerprint recognition sensor and the input processor 930 may be formed in one sensor chip. For example, the input processor 930 of FIGS. 9A and 9B may have a structure including a fingerprint recognition sensor therein. The electronic device 201 may receive an input of a user fingerprint in an external area (e.g., a home key of a front portion of the electronic device 201) of the electronic device 201 corresponding to a portion of a casing 920 and receive a touch input from a user in an external area (e.g., a soft key of a front portion of the electronic device 201 or a touch input area of a side surface portion of the electronic device 201) of the electronic device 201 corresponding to a portion of the touch sensor 940.

The mounting structure may mount an input sensing module. The support structure 910 may be located within the electronic device 201, and in the support structure 910, space that houses the mounting structure may be formed.

The mounting structure may include the casing 920, circumferential edge portion 950, and cover glass 960. The input processor 930 may be mounted in the casing 920. The circumferential edge portion 950 may be physically divided from the casing 920 and may be disposed to enclose a side surface of the input processor 930 of the input sensing module. For example, a portion of the circumferential edge portion 950 may form a circumferential edge of a home key provided in a front portion of the electronic device 201. A portion of the circumferential edge portion 950 may be protruded to the outside of the electronic device 201 to form a ring or a bezel representing a circumferential edge of the home key. The cover glass 960 may be stacked in an upper portion of the input sensing module. The cover glass 960 of the mounting structure may have a thickness different from that of glass stacked in an upper portion of a screen (e.g., touch screen) of the electronic device 201. For example, in order for the fingerprint recognition sensor to smoothly detect a user fingerprint, a thickness of the cover glass 960 may have a thickness smaller than a sensing distance of the fingerprint recognition sensor.

The casing 920 and the circumferential edge portion 950 may be made of a conductive material. The circumferential edge portion 950 may be electrically floated from the casing 920.

The input processor 930 may be mounted in an upper portion of the casing 920. A fingerprint recognition sensor may be mounted in an upper portion of the input processor 930. The touch sensor 940 may be mounted in an upper portion of the support structure 910.

A portion of the flexible circuit board 935 may be supported by an upper portion of the casing 920. In the flexible circuit board 935, other portions that are not supported by an upper portion of the casing 920 may be supported by an upper portion of the support structure 910.

The circumferential edge portion 950 may include a protruding portion 955 protruded in a direction toward a side surface of the input processor 930. The protruding portion 955 may support the cover glass 960 in at least a portion of a lower surface of the cover glass 960. An upper surface of the protruding portion 955 and an upper surface of the input processor 930 may form one plane. For example, an upper surface of the protruding portion 955 and an upper surface of the input processor 930 may form one plane to support the cover glass 960. When the cover glass 960 is not reinforcement processed or has a small thickness in consideration of a sensing distance of a fingerprint recognition sensor, the cover glass 960 may be easily damaged due to an external impact. When an upper surface of the protruding portion 955 and an upper surface of the input processor 930 form one plane, the upper surface of the protruding portion 955 and the upper surface of the input processor 930 stably support a flat lower surface of the cover glass 960, thereby preventing the cover glass 960 from being damaged.

FIG. 9B illustrates an embodiment of the electronic device 201 in which a form of the electronic device 201, the casing 920, and the circumferential edge portion 950 of FIG. 9A is changed. In FIG. 9B, a detailed description of a configuration identical to or corresponding to that of FIG. 9A is omitted.

Referring to FIG. 9B, the casing 920 of the electronic device 201 may include a lower plate and a side surface portion. For example, the casing 920 may include a lower plate and two side surface portions integrally formed with the lower plate. The lower plate may support the input processor 930 by a contact with a portion of the flexible circuit board 935 in which the input processor 930 is mounted. The side surface portion may be formed integrally with the lower plate. The side surface portion may form space extended in a vertical direction at an upper surface of the lower plate and that houses the input processor 930 together with the lower plate.

A slot in which the flexible circuit board 935 penetrates may be formed in a portion of the side surface portion. For example, the touch sensor 940 may be connected to both terminals of the flexible circuit board 935 connected by passing through respective slots of two side surface portions. The side surface portion may have an upper groove for inserting the flexible circuit board 935. The flexible circuit board 935 may be inserted to contact a plate through space formed between a plurality of side surface portions.

An upper surface of the side surface portion and an upper surface of the input processor 930 may form one plane. For example, an upper surface of the side surface portion may support the cover glass 960 in at least a portion of a lower surface of the cover glass 960.

For example, when the cover glass 960 is not reinforcement processed or has a small thickness in consideration of a sensing distance of a fingerprint recognition sensor, the cover glass 960 may be weak on an external impact. According to an embodiments of the present disclosure, an upper surface of the side surface portion and an upper surface of the input processor 930 form one plane to stably support a flat lower surface of the cover glass 960, thereby preventing the cover glass 960 from being damaged.

Referring to FIGS. 9A and 9B, the electronic device 201 may include an area 990 in which a conductive body layer of the flexible circuit board 935 and the support structure 910 are electrically connected. The flexible circuit board 935 may include a lower solder mask layer disposed in an upper portion of the support structure 910, a conductive body layer disposed on the lower solder mask layer, and upper solder mask layer disposed in an upper portion of the conductive body layer. An opening portion that exposes the conductive body layer may be formed in the lower solder mask layer. The conductive body layer exposed through the opening portion may be electrically connected to the support structure 910 to form a path in which an abnormal voltage (e.g., a surge voltage) according to static electricity is discharged.

A coating layer may be formed at the lower end of the cover glass 960. An adhesive layer 970 may be stacked between the input processor 930 and the cover glass 960. A deposition film 980 may be stacked between the adhesive layer 970 and the cover glass 960. For example, when a general coating layer is formed between the input processor 930 and the cover glass 960, an area in which an external coating layer of the electronic device 201 is formed may be represented with a color or a texture distinguished from a peripheral area of the electronic device 201. When the deposition film 980 is stacked between the input processor 930 and the cover glass 960, a color or a texture appeared at an external appearance of the electronic device 201 may correspond. For example, the deposition film 980 may have various colors, materials, patterns, or shapes that may represent an external color or texture of the electronic device 201. The electronic device 201 stacks the deposition film 980 between the input processor 930 and the cover glass 960, thereby enhancing a color or a texture of the electronic device 201. According to various embodiments of the present disclosure, by enhancing color, material, and finishing (CMF) of the electronic device, the electronic device can provide an enhanced appearance to a user.

Figure 10:
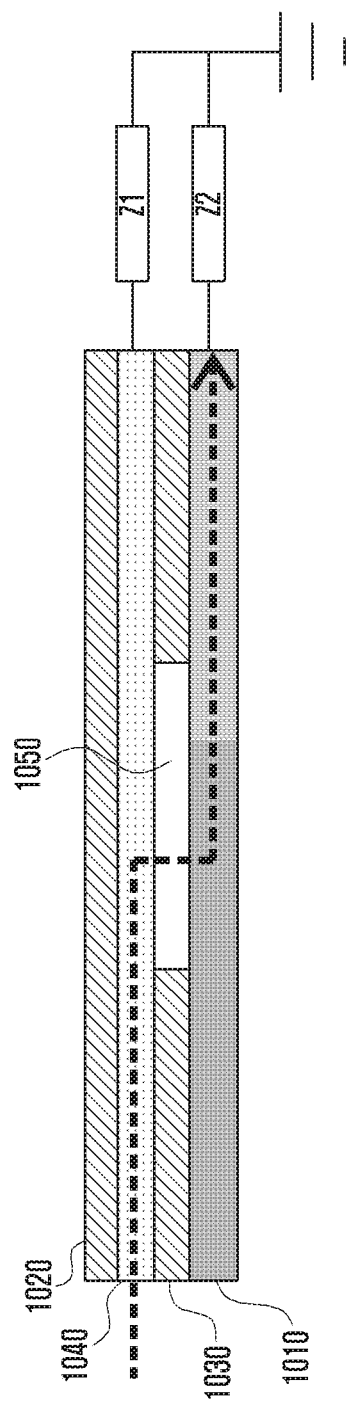
FIG. 10 is a diagram illustrating a structure for preventing electro static discharge (ESD) of an electronic device according to an embodiment of the present disclosure.

FIG. 10 is a diagram illustrating a structure for preventing electro static discharge (ESD) of an electronic device according to various embodiments of the present disclosure.

Referring to FIG. 10, a flexible circuit board included in the input sensing module 259 of the electronic device 101 may include a conductive body layer 1040 and solder mask layers 1020 and 1030. The flexible circuit board may include a lower solder mask layer 1030 disposed in an upper portion of a support structure 1010 located within the electronic device 101, a conductive body layer 1040 disposed on the lower solder mask layer 1030, and an upper solder mask layer 1020 disposed at an upper portion of the conductive body layer 1040. The conductive body layer 1040 may include a circuit pattern of the flexible circuit board. For example, the conductive body layer 1040 may be a copper (Cu) pattern of the flexible circuit board. The conductive body layer 1040 may be a copper pattern of the flexible circuit board electrically connected to the ground.

An opening portion 1050 that exposes the conductive body layer 1040 may be formed in the lower solder mask layer 1030. The conductive body layer 1040 exposed through the opening portion 1050 of the lower solder mask layer 1030 may be electrically connected to the support structure 1010. Impedance Z1 of the conductive body layer 1040 may be larger than impedance Z2 of the support structure 1010. The support structure 1010 may perform the same electrical function as that of the ground.

As indicated by an arrow in FIG. 10, in the electronic device 101, the conductive body layer 1040 exposed through the opening portion 1050 and the support structure 1010 electrically connected to the conductive body layer 1040 may form a path in which an electrical signal is discharged. For example, in the electronic device 101, because the impedance Z2 of the support structure 1010 is relatively lower than the impedance Z1 of the conductive body layer 1040, a path in which an electrical signal (e.g., a surge voltage) that has occurred due to static electricity is discharged through the support structure 1010 having lower impedance may be formed.

An electronic device according to various embodiments of the present disclosure electrically connects the conductive body layer 1040 to the support structure 1010 by opening a portion of the lower solder mask layer 1030 of the conductive body layer 1040, thereby forming a structure for protecting ESD. The electronic device 101 may include a structure that discharges an abnormal voltage (surge voltage) that has occurred due to static electricity.

Figure 11A:
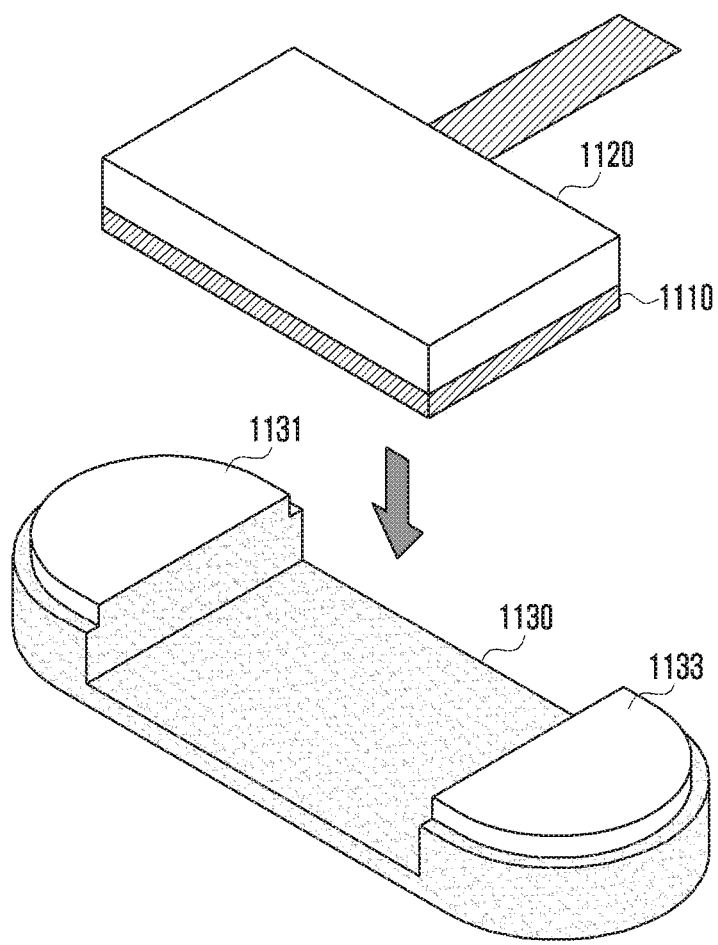
FIGS. 11A to 11C are views illustrating a structure of an electronic device according to various embodiments of the present disclosure.
Figure 11B:
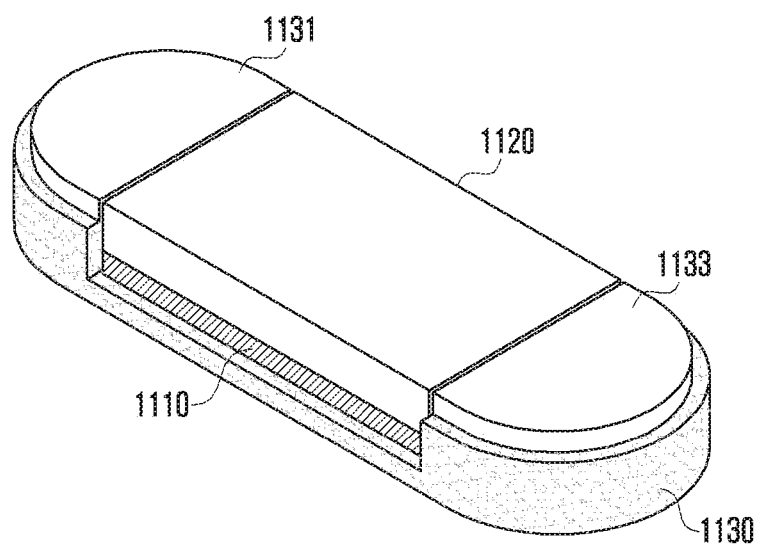
Figure 11C:
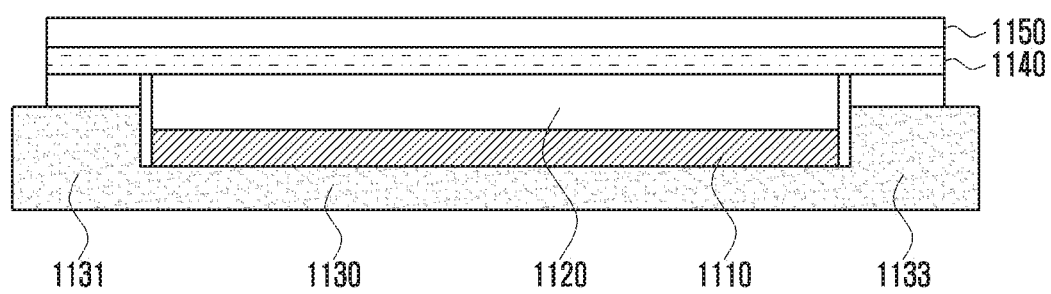

FIGS. 11A to 11C are views illustrating a structure of an input sensing module of an electronic device according to various embodiments of the present disclosure.

Referring to FIG. 11A, the input sensing module 259 may have a structure in which an input processor 1120 is stacked on a flexible circuit board 1110. Although not shown in FIGS. 11A to 11C, the fingerprint recognition sensor 2591 and the touch sensor 2593 may be electrically connected to the flexible circuit board 1110. The fingerprint recognition sensor 2591 may be stacked on the input processor 1120 or may be included in the input processor 1120. For example, the input processor 1120 may be a sensor chip including the fingerprint recognition sensor 2591.

A casing 1130 of the electronic device 201 may include space that houses the input sensing module 259. For example, the casing 1130 may include a lower plate that supports the input processor 1120 by a contact with a portion of the flexible circuit board 1110 in which the input processor 1120 is mounted and side surface portions 1131 and 1133 integrally formed with the lower plate to be extended in a vertical direction at an upper surface of the lower plate. In FIG. 11A, the outside of the side surface portions 1131 and 1133 has a bent form and has a two layer structure, but a form of the side surface portions 1131 and 1133 is not limited thereto.

FIG. 11B illustrates a state in which the flexible circuit board 1110 that mounts the input processor 1120 is housed in the casing 1130. As illustrated in FIG. 11B, an upper surface of the side surface portions 1131 and 1133 of the casing 1130 and an upper surface of the input processor 1120 may form one plane.

FIG. 11C illustrates a side cross-sectional view of the casing 1130 in which the input sensing module 259 of FIG. 11B is housed. As illustrated in FIG. 11C, an adhesive layer 1140 may be stacked on an upper surface of the side surface portions 1131 and 1133 and an upper surface of the input processor 1120. Cover glass 1150 may be stacked in an upper portion of the adhesive layer 1140.

According to another exemplary embodiment of the present disclosure, a deposition film (not shown) may be stacked between the adhesive layer 1140 and the cover glass 1150. For example, when a general coating layer is formed between the input processor 1120 and the cover glass 1150, an area in which an external coating layer of the electronic device 201 is formed may be represented with a color or a texture distinguished from a peripheral area of the electronic device 201. As the deposition film is stacked between the adhesive layer 1140 and the cover glass 1150, a color or a texture appeared at an external appearance of the electronic device 201 may correspond. For example, as the deposition film is stacked in a lower portion of the cover glass 1150, a color or a texture of a home key forming area (e.g., an external area of the electronic device 201 corresponding to an area in which the input processor 1120 of the electronic device 201 is mounted) of the electronic device 201 and a peripheral area thereof may correspond.

The deposition film may have various colors, materials, patterns, or shapes that may represent an external color or texture of the electronic device 201. For example, a color or a texture of an external appearance of the electronic device 201 may be variously changed according to a color, material, pattern, or shape of the deposition film.

According to an embodiment of the present disclosure, an upper surface of the side surface portions 1131 and 1133 and an upper surface of the input processor 1120 may form one plane to support the cover glass 1150. When the cover glass 1150 has a small thickness or is not reinforcement processed, the cover glass 1150 may be weak on an external impact, but an upper surface of the side surface portions 1131 and 1133 and an upper surface of the input processor 1120 uniformly support a lower surface of the flat cover glass 1150, thereby preventing the cover glass 1150 from being damaged by an external impact.

Figure 12A:
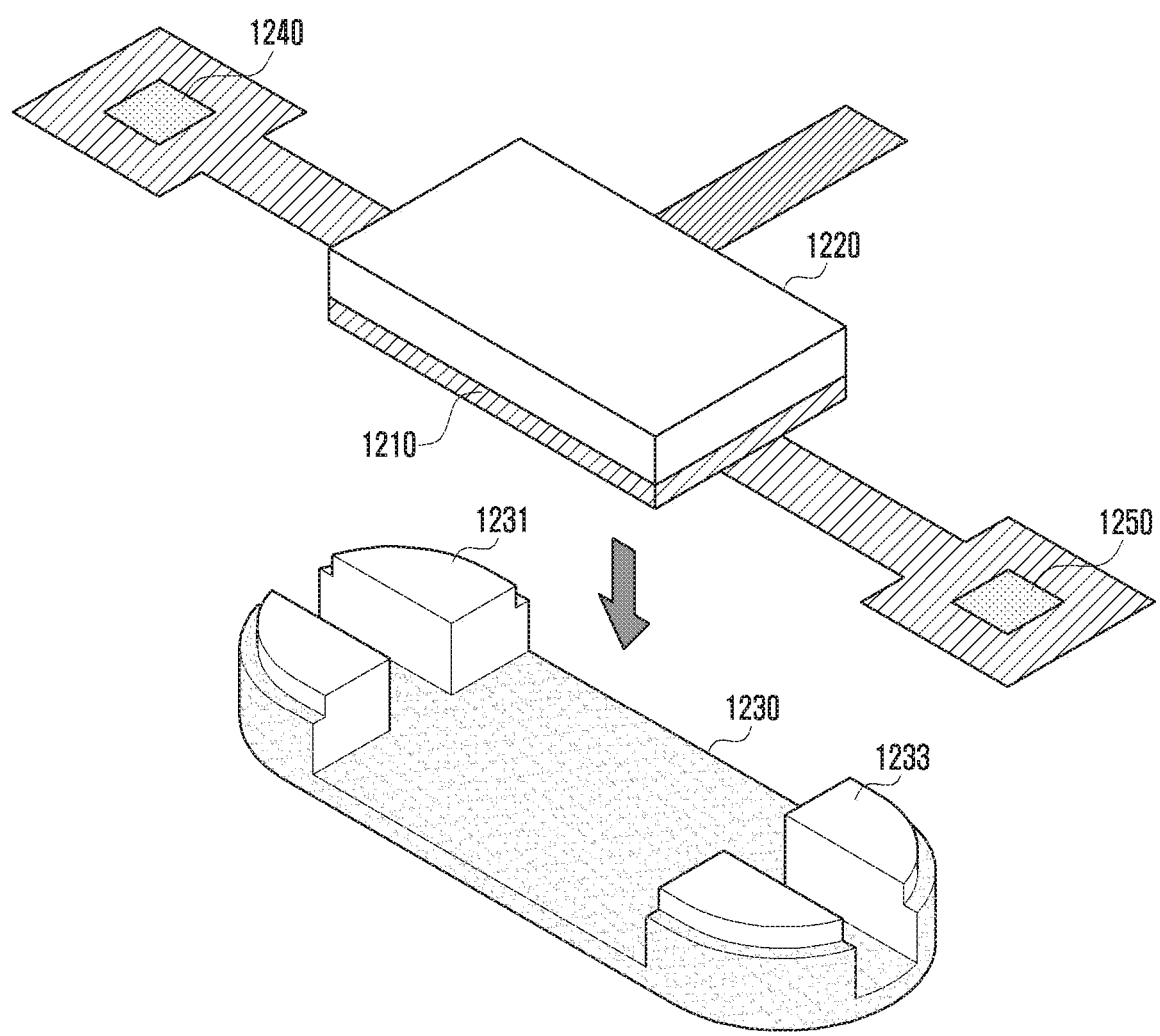
FIGS. 12A and 12B are perspective views illustrating a structure of an electronic device according to various embodiments of the present disclosure.
Figure 12B:
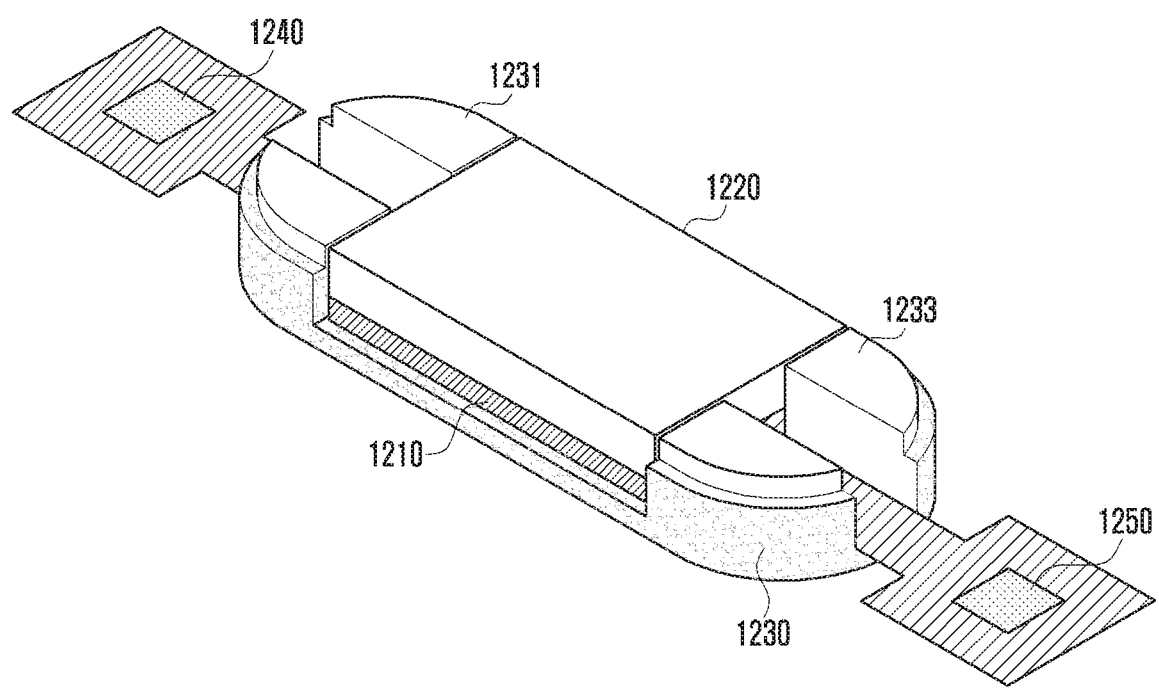

FIGS. 12A and 12B are perspective views illustrating a structure of an electronic device according to various embodiments of the present disclosure.

Referring to FIG. 12A, the input sensing module 259 may have a structure in which an input processor 1220 is mounted on a flexible circuit board 1210. The flexible circuit board 1210 may include a portion extended to the upper end so as to connect a connector about a portion in which the input processor 1220 is mounted and a portion extended to a side surface so as to mount touch sensors 1240 and 1250. For example, the touch sensors 1240 and 1250 may be mounted in the flexible circuit board 1210, at respective portions connected to the left side and the right side of a portion in which the input processor 1220 is mounted.

A casing 1230 of the electronic device 201 may include space that houses the input sensing module 259 (i.e., the flexible circuit board 1210 in which the input processor 1220 is mounted). For example, the casing 1230 may include a lower plate that supports the input processor 1220 by a contact with a portion of the flexible circuit board 1210 and side surface portions 1231 and 1233 integrally formed with the lower plate to be extended in a vertical direction at an upper surface of the lower plate. A groove or a slot in which a portion of the flexible circuit board 1210 may penetrate may be formed at the side surface portions 1231 and 1233. For example, a groove or a slot that houses a portion extended to a side surface of the flexible circuit board 1210 may be formed at the side surface portions 1231 and 1233.

At the flexible circuit board 1210, a portion in which the touch sensors 1240 and 1250 are mounted may be disposed at the outside of the casing 1230 through a groove or a slot of the side surface portions 1231 and 1233. A width or a form of the groove or the slot of the side surface portions 1231 and 1233 may be variously changed according to a width or a form of the housed flexible circuit board 1210.

FIG. 12B illustrates a state in which the flexible circuit board 1210 that mounts the input processor 1220 of FIG. 11A is mounted in the casing 1230. A portion of the flexible circuit board 1210 housed in the casing 1230 may penetrate a groove or a slot formed in the side surface portions 1231 and 1233. For example, at the flexible circuit board 1210, a portion in which the touch sensors 1240 and 1250 is mounted may be disposed at the outside of the casing 1230. The input processor 1220 may be disposed at a location corresponding to a home key area of a front portion of the electronic device 201, and the touch sensors 1240 and 1250 may be disposed at a location corresponding to a soft key area of a front portion of the electronic device 201. The touch sensors 1240 and 1250 may be disposed at a location corresponding to a touch input area of a side surface portion of the electronic device 201.

An upper surface of the side surface portions 1231 and 1233 of the casing 1230 and an upper surface of the input processor 1220 may form one plane. For example, an upper surface of the side surface portions 1231 and 1233 of the casing 1230 and an upper surface of the input processor 1220 may support cover glass to be stacked at an upper surface of the input processor 1220.

Figure 13:
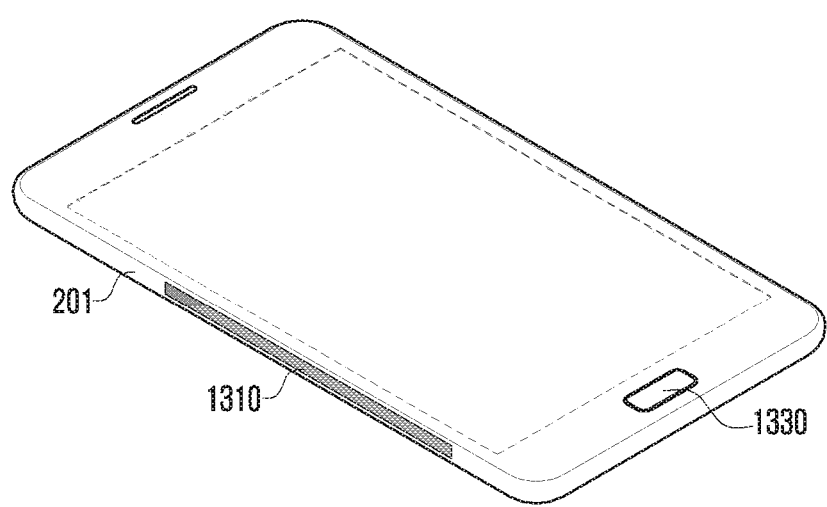
FIG. 13 is a perspective view illustrating an electronic device according to an embodiment of the present disclosure.

FIG. 13 is a perspective view illustrating an electronic device according to an embodiment of the present disclosure.

Referring to FIG. 13, the electronic device 201 may have a touch screen area and a home key forming area in a front portion. The electronic device 201 may have a touch input area 1310 in a side surface portion. For example, in the electronic device 201, a home key 1330 may be disposed at the center of the lower end of the front portion, and a touch input area 1310 that can receive a touch input of a user may be formed in a side surface portion thereof. In the electronic device 201, a touch input area 1310 may be formed in at least a portion of at least one surface of the side surface portion. For example, in the electronic device 201, a touch input area 1310 may be formed in a portion of a side surface of the left side. In the electronic device 201, two touch input areas 1310 may be formed in a portion of a left side surface and a right side surface.

A fingerprint recognition sensor 2591 may be disposed at a location corresponding to a home key forming area of the electronic device 201. A touch sensor 2593 may be disposed at a location corresponding to the touch input area 1310 of the electronic device 201. For example, the touch sensor 2593 may include a touch panel. The touch input area 1310 of a side surface of the electronic device 201 may be a touch area separated from a touch screen of a front surface. The touch input area 1310 of a side surface of the electronic device 201 may be integrally formed with the touch screen to be connected to a side surface. For example, the touch input area 1310 of a side surface of the electronic device 201 may be a flexible touch screen (or a flexible touch panel) integrally formed with the touch screen of a front portion.

The fingerprint recognition sensor 2591 corresponding to a home key forming area of the electronic device 201 and the touch sensor 2593 corresponding to the touch input area 1310 may be mounted in one flexible circuit board. An input processor that processes an input received from the fingerprint recognition sensor 2591 or the touch sensor 2593 and that transfers the processed input to a processor may be mounted in the flexible circuit board.

The electronic device 201 may detect a user fingerprint through the home key 1330 and detect a touch input through the touch input area 1310 formed at a side surface. The electronic device 201 may receive a user fingerprint input or touch input through the home key 1330 formed in a front portion or the touch input area 1310 formed in a side surface portion and provide a function corresponding to the received fingerprint input or touch input.

A fingerprint recognition area (e.g., a home key forming area) 1330 and a touch input area 1310 of the electronic device 201 are not limited to a location of FIG. 13 and may be variously changed.

As described above, in an electronic device according to various embodiments of the present disclosure, a function of a touch sensor and a fingerprint recognition sensor can be provided together with one input processor and one flexible substrate.

In an electronic device according to various embodiments of the present disclosure, a plurality of sensors using the same sensing method can be integrally managed.

In an electronic device according to various embodiments of the present disclosure, damage danger of cover glass due to an external impact can be reduced.

In an electronic device according to various embodiments of the present disclosure, complexity of a production process that has occurred when using each module separated on a sensor basis can be solved and a production cost can be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an input sensing module comprising:
      a flexible circuit board,
      at least one fingerprint recognition sensor and at least one touch sensor each electrically connected to the flexible circuit board, and
      an input processor configured to receive and process an input from the at least one fingerprint recognition sensor and the at least one touch sensor through the flexible circuit board;
   a mounting structure in which the input sensing module is mounted; and
   a support structure comprising a space to house the mounting structure, the space being located within the electronic device,
   wherein the mounting structure comprises:
      a casing that mounts the input processor,
      a circumferential edge portion physically divided from the casing and disposed to enclose a side surface of the input processor of the input sensing module, and
      a cover glass stacked in an upper portion of the input sensing module,
   wherein the at least one fingerprint recognition sensor is mounted on an upper portion of the input processor and the at least one touch sensor is mounted on an upper portion of the support structure spaced apart from the input processor, and
   wherein the fingerprint recognition sensor is formed integrally with the input processor.

2. The electronic device of claim 1, wherein the circumferential edge portion is electrically floated from the casing.

3. The electronic device of claim 1, wherein the casing and the circumferential edge portion are made of a conductive material.

4. The electronic device of claim 1,
wherein the input processor is mounted in an upper portion of the casing.

5. The electronic device of claim 1,
wherein a portion of the flexible circuit board is supported by an upper portion of the casing, and
wherein other portions of the flexible circuit board, except for the portion of the flexible circuit board, are supported by the upper portion of the support structure.

6. The electronic device of claim 1, wherein the flexible circuit board comprises:
a lower solder mask layer disposed in the upper portion of the support structure;
a conductive body layer disposed on the lower solder mask layer; and
an upper solder mask layer disposed in an upper portion of the conductive body layer,
wherein an opening portion that exposes the conductive body layer is formed in the lower solder mask layer, and
wherein the conductive body layer exposed through the opening portion is electrically connected to the support structure.

7. The electronic device of claim 1, wherein the support structure is made of a material having impedance lower than that of the conductive body layer.

8. The electronic device of claim 1,
wherein the circumferential edge portion comprises a protruding portion protruded in a direction toward a side surface of the input processor, and
wherein the protruding portion supports the cover glass in at least a portion of a lower surface of the cover glass.

9. The electronic device of claim 8, wherein an upper surface of the protruding portion and an upper surface of the input processor form one plane.

10. The electronic device of claim 1, wherein the casing comprises:
a lower plate that supports the input processor by a contact with a flexible circuit board portion in which the input processor is mounted; and
two side surface portions integrally formed with the lower plate and extended in a vertical direction at an upper surface of the lower plate to form space that houses the input processor together with the lower plate.

11. The electronic device of claim 10, wherein a slot in which the flexible circuit board penetrates is formed in a portion of the two side surface portions.

12. The electronic device of claim 10, wherein an upper surface of the two side surface portions and an upper surface of the input processor form one plane.

13. The electronic device of claim 10, wherein an upper surface of the two side surface portions supports the cover glass in at least a portion of a lower surface of the cover glass.

* * * * *